US011964847B2

(12) United States Patent
Wei et al.

(10) Patent No.: US 11,964,847 B2
(45) Date of Patent: Apr. 23, 2024

(54) SYSTEM AND METHOD FOR DETECTING PASSENGERS MOVEMENT, ELEVATOR-CALLING CONTROL METHOD, READABLE STORAGE MEDIUM AND ELEVATOR SYSTEM

(71) Applicant: Otis Elevator Company, Farmington, CT (US)

(72) Inventors: Lieping Wei, Shanghai (CN); Wenbo Huang, Shanghai (CN); Heping Qiu, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1246 days.

(21) Appl. No.: 16/582,915

(22) Filed: Sep. 25, 2019

(65) Prior Publication Data

US 2020/0095090 A1 Mar. 26, 2020

(30) Foreign Application Priority Data

Sep. 26, 2018 (CN) ........................ 201811121510.9

(51) Int. Cl.
*B66B 1/46* (2006.01)
*B66B 5/00* (2006.01)

(52) U.S. Cl.
CPC ............ *B66B 1/468* (2013.01); *B66B 5/0012* (2013.01); *B66B 2201/101* (2013.01);
(Continued)

(58) Field of Classification Search
CPC . B66B 1/468; B66B 5/0012; B66B 2201/101; B66B 2201/23;
(Continued)

(56) References Cited

U.S. PATENT DOCUMENTS

| | | | |
|---|---|---|---|
| 6,257,373 B1 | 7/2001 | Hikita et al. |
| 7,552,800 B2 | 6/2009 | Puskala et al. |

(Continued)

FOREIGN PATENT DOCUMENTS

| | | | |
|---|---|---|---|
| CN | 102037204 B | 8/2014 |
| CN | 107572323 A | 1/2018 |

(Continued)

OTHER PUBLICATIONS

Zheng, Y.P. et al., "A Novel Intelligent Elevator Group Control Algorithm Based on Corridor Passenger Detection and Tracking"; abstract, Applied Mechanics and Materials, vols. 336-338, 2013, 3 pages.

(Continued)

*Primary Examiner* — Jeffrey Donels
(74) *Attorney, Agent, or Firm* — CANTOR COLBURN LLP

(57) ABSTRACT

A system and a method for detecting passenger movement, an elevator-calling control method, a readable storage medium and an elevator system are provided by the present disclosure. The system for detecting passenger movement includes: a Bluetooth matrix installed in an elevator landing area, the Bluetooth matrix including at least three Bluetooth modules, and each of the Bluetooth modules being configured to broadcast a Bluetooth signal to the elevator landing area respectively; wherein the system for detecting passenger movement acquires location information of a passenger carrying a personal mobile terminal by using Bluetooth signals broadcast by at least three Bluetooth modules; the system for detecting passenger movement further includes: a movement prediction unit configured to fit a movement trajectory of the passenger in the elevator landing area based on multiple sets of the location information, and predict the
(Continued)

movement trajectory to be a calling trajectory or a non-calling trajectory.

20 Claims, 1 Drawing Sheet

(52) U.S. Cl.
CPC ... *B66B 2201/23* (2013.01); *B66B 2201/4638* (2013.01); *B66B 2201/4653* (2013.01)

(58) Field of Classification Search
CPC .... B66B 2201/4638; B66B 2201/4653; B66B 2201/4623; B66B 5/0006
See application file for complete search history.

(56) References Cited

U.S. PATENT DOCUMENTS

| | | | |
|---|---|---|---|
| 8,020,672 | B2 | 9/2011 | Lin et al. |
| 8,573,366 | B2 | 11/2013 | Elomaa et al. |
| 10,017,355 | B2 | 7/2018 | Silvennoinen et al. |
| 2009/0057068 | A1* | 3/2009 | Lin ........................... B66B 1/34 187/392 |
| 2013/0245832 | A1* | 9/2013 | Blom .................... H04W 4/029 700/275 |
| 2014/0329537 | A1 | 11/2014 | Huang |
| 2015/0291388 | A1 | 10/2015 | Hovi et al. |
| 2016/0207735 | A1 | 7/2016 | Elomaa et al. |
| 2016/0291558 | A1 | 10/2016 | Finn et al. |
| 2017/0019769 | A1 | 1/2017 | Li |
| 2017/0144859 | A1* | 5/2017 | Scoville .................. B66B 1/468 |
| 2017/0349402 | A1* | 12/2017 | Chapman .............. B66B 1/3492 |
| 2018/0052519 | A1* | 2/2018 | Amores-Llopis ....... H04L 67/12 |
| 2018/0052520 | A1* | 2/2018 | Amores Llopis ..... G06F 3/0304 |
| 2018/0053504 | A1 | 2/2018 | Wang et al. |
| 2018/0370758 | A1* | 12/2018 | Huang ...................... B66B 1/50 |
| 2019/0152742 | A1* | 5/2019 | Chen ..................... B66B 19/007 |
| 2019/0168994 | A1* | 6/2019 | Li ........................... H04W 4/20 |
| 2019/0292010 | A1* | 9/2019 | Li ......................... G06F 1/3209 |
| 2019/0349724 | A1* | 11/2019 | Chen ..................... H04W 76/10 |

FOREIGN PATENT DOCUMENTS

| | | | |
|---|---|---|---|
| DE | 10260109 | A1 | 7/2004 |
| EP | 0935045 | A2 | 8/1999 |
| JP | 2011002339 | A | 1/2011 |
| JP | 6181446 | B2 | 7/2017 |
| WO | 2008116963 | A1 | 10/2008 |

OTHER PUBLICATIONS

European Search Report for application EP 19199971.3, dated Mar. 20, 2020, 44 pages.
European Search Report for Application No. 19199971.3, dated Jun. 22, 2023, 4 Pages.

* cited by examiner

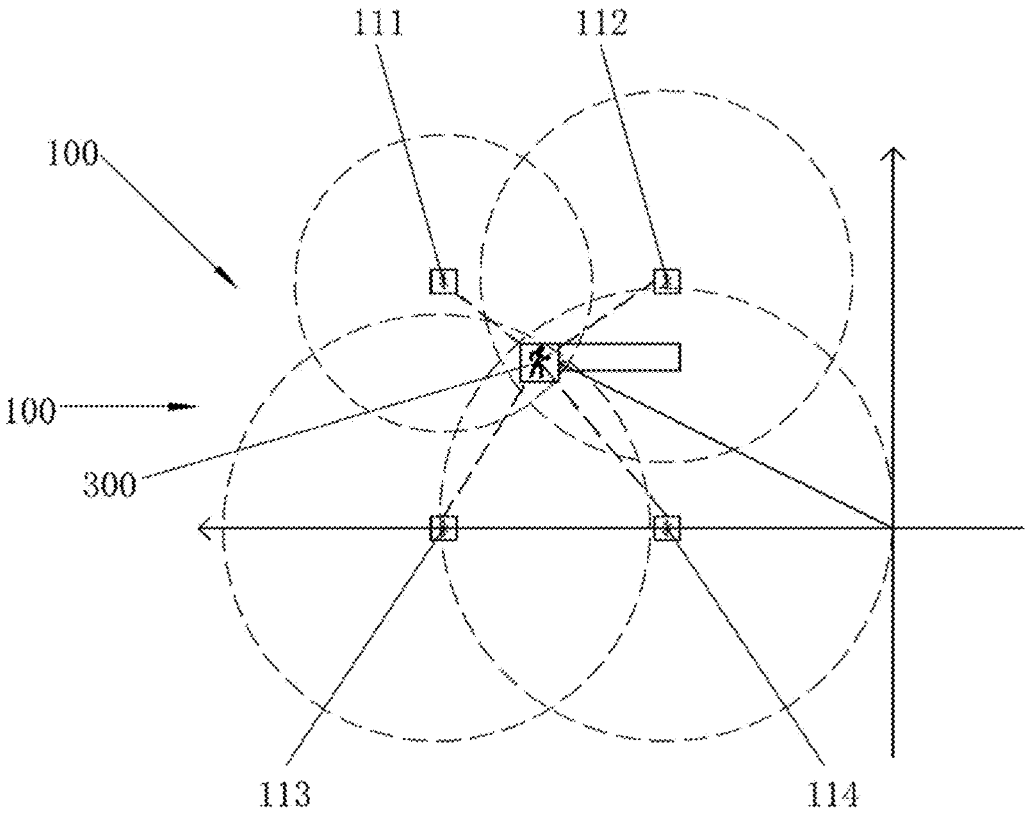
【Fig. 1】
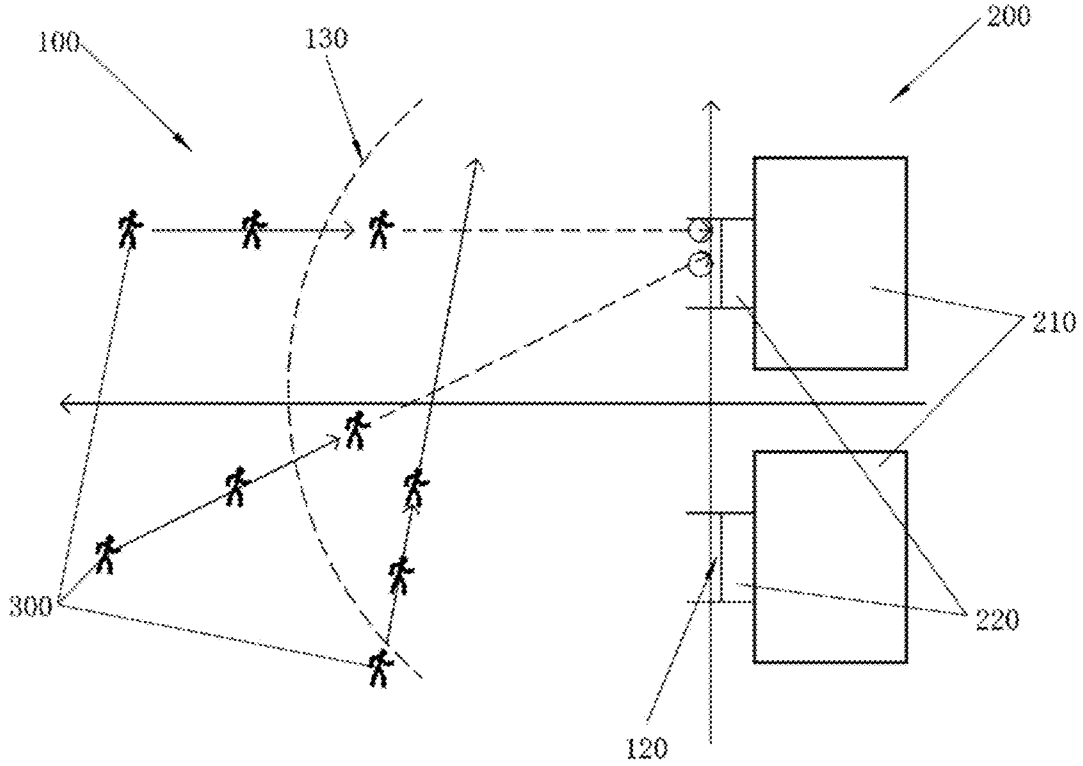
【Fig. 2】

SYSTEM AND METHOD FOR DETECTING PASSENGERS MOVEMENT, ELEVATOR-CALLING CONTROL METHOD, READABLE STORAGE MEDIUM AND ELEVATOR SYSTEM

FOREIGN PRIORITY

This application claims priority to Chinese Patent Application No. 201811121510.9, filed Sep. 26, 2018, and all the benefits accruing therefrom under 35 U.S.C. § 119, the contents of which in its entirety are herein incorporated by reference.

FIELD OF THE INVENTION

The present application relates to the field of intelligent elevator control technology, and relates to a system and method for detecting passenger's movement, an elevator system using the same, and an elevator-calling control method.

BACKGROUND OF THE INVENTION

At present, with the development of elevator technology, various input-free automatic elevator calling and dispatching technologies have emerged. For example, the elevator system may automatically send an elevator-calling request command to an elevator system and dispatch an elevator, according to a movement of the passenger. However, due to the uncertainty of the movement of the passenger relative to an elevator car, the generation of an invalid elevator-calling request command may be easily caused. For example, when the passenger passes through an elevator landing area but does not enter the elevator car to take the elevator, this movement may easily cause the generation of an invalid elevator-calling request command.

SUMMARY OF THE INVENTION

In view of this, the present application provides a system and a method for detecting passenger's movement, an elevator-calling control method, a readable storage medium and an elevator system, thereby effectively solving or at least alleviating one or more of the above problems in the prior art and problems existing in other aspects.

In order to achieve the object of the present application, according to a first aspect of the present application, a system for detecting passenger's movement is provided, which includes: a Bluetooth matrix installed in an elevator landing area, the Bluetooth matrix including at least three Bluetooth modules, and each of the Bluetooth modules being configured to broadcast a Bluetooth signal to the elevator landing area respectively; wherein the system for detecting passenger's movement acquires location information of a passenger carrying a personal mobile terminal by using Bluetooth signals broadcast by at least three Bluetooth modules; the system for detecting passenger's movement further includes: a movement prediction unit configured to fit a movement trajectory of the passenger in the elevator landing area based on multiple sets of the location information, and predict the movement trajectory to be a calling trajectory or a non-calling trajectory.

Optionally, the movement prediction unit is configured to predict the movement trajectory to be the calling trajectory in a case that an end point of the movement trajectory falls within a set calling interval; and predict the movement trajectory to be the non-calling trajectory in a case that the end point of the movement trajectory does not fall within the set calling interval.

Optionally, the set calling interval includes each elevator door and a first preset length on one side or both sides of the elevator door.

Optionally, the movement prediction unit is configured to start performing the prediction action when the location information of the passenger is within a set calling range.

Optionally, the set calling range is within a first preset radius centering at each elevator car.

Optionally, the Bluetooth modules in the Bluetooth matrix are equally spaced apart.

Optionally, the Bluetooth matrix is arranged in a form of rectangular or triangular grids, wherein the Bluetooth modules are located at respective intersections of the grids.

Optionally, the Bluetooth modules in the Bluetooth matrix are spaced apart from each other by 4 to 8 meters.

Optionally, the Bluetooth signal of the Bluetooth module has a broadcast interval of 0.02 second to 1 second.

In order to achieve the object of the present application, according to another aspect of the present application, an elevator system is further provided, which includes a plurality of elevator cars, an elevator controller, and a movement detection system; the movement detection system includes: a Bluetooth matrix installed in an elevator landing area, the Bluetooth matrix including at least three Bluetooth modules, and each of the Bluetooth modules being configured to broadcast a Bluetooth signal to the elevator landing area respectively; wherein the movement detection system acquires location information of a passenger carrying a personal mobile terminal by using Bluetooth signals broadcast by at least three Bluetooth modules; the movement detection system further includes: a movement prediction unit configured to fit a movement trajectory of the passenger in the elevator landing area based on multiple sets of the location information, and predict the movement trajectory to be a calling trajectory or a non-calling trajectory.

Optionally, the elevator controller is further configured to receive a calling request command transmitted from the personal mobile terminal, and assign an elevator corresponding to the predicted calling trajectory to go to a corresponding floor, based on the predicted calling trajectory.

Optionally, the movement prediction unit is configured to predict the movement trajectory to be the calling trajectory in a case that an end point of the movement trajectory falls within a set calling interval; and predict the movement trajectory to be the non-calling trajectory in a case that the end point of the movement trajectory does not fall within the set calling interval.

Optionally, the set calling interval includes each elevator door and a first preset length on one side or both sides of the elevator door.

Optionally, the movement prediction unit is configured to start performing the prediction action when the location information of the passenger is within a set calling range.

Optionally, the set calling range is within a first preset radius centering at each elevator car.

Optionally, the Bluetooth modules in the Bluetooth matrix are equally spaced apart.

Optionally, the Bluetooth matrix is arranged in a form of rectangular or triangular grids, wherein the Bluetooth modules are located at respective intersections of the grids.

In order to achieve the object of the present application, according to another aspect of the present application, a method for detecting passenger's movement is further provided, which includes: acquiring location information of a passenger carrying a personal mobile terminal by using Bluetooth signals broadcast by at least three Bluetooth modules in a Bluetooth matrix installed in an elevator landing area, fitting a movement trajectory of the passenger in the elevator landing area based on multiple sets of the location information, and predicting the movement trajectory to be a calling trajectory or a non-calling trajectory.

Optionally, the movement trajectory is predicted to be the calling trajectory in a case that an end point of the movement trajectory falls within a set calling interval, and is predicted to be the non-calling trajectory in a case that the end point of the movement trajectory does not fall within the set calling interval.

Optionally, the set calling interval includes each elevator door and a first preset length on one side or both sides of the elevator door.

Optionally, performance of the prediction action is started when the location information of the passenger is within a set calling range.

Optionally, the set calling interval is within a first preset radius centering at each elevator car.

Optionally, the location information of the passenger is acquired based on at least three Bluetooth modules in the Bluetooth matrix that are closest to the passenger carrying the personal mobile terminal.

Optionally, the location information of the passenger is acquired based on at least three Bluetooth modules in the Bluetooth matrix that have the strongest broadcast signals received by the personal mobile terminal carried by the passenger.

Optionally, the acquired location information is corrected based on a Bluetooth signal broadcast by at least a fourth Bluetooth module in the Bluetooth matrix.

Optionally, the Bluetooth signal of the Bluetooth module has a broadcast interval of 0.02 second to 1 second.

In order to achieve the object of the present application, according to another aspect of the present application, a readable storage medium is further provided, which has a computer program stored thereon, wherein the program is executable by a processor to implement the steps of the method as described above.

In order to achieve the object of the present application, according to another aspect of the present application, an elevator-calling control method for a passenger is further provided, which includes: acquiring location information of a passenger carrying a personal mobile terminal by using Bluetooth signals broadcast by at least three Bluetooth modules in a Bluetooth matrix installed in an elevator landing area; fitting a movement trajectory of the passenger in the elevator landing area based on multiple sets of the location information, and predicting the movement trajectory to be a calling trajectory or a non-calling trajectory; and in a case that the movement trajectory is predicted to be the calling trajectory, assigning an elevator corresponding to the calling trajectory to go to a corresponding floor.

Optionally, the movement trajectory is predicted to be the calling trajectory in a case that an end point of the movement trajectory falls within a set calling interval, and is predicted to be the non-calling trajectory in a case that the end point of the movement trajectory does not fall within the set calling interval.

Optionally, the set calling interval includes each elevator door and a first preset length on one side or both sides of the elevator door.

Optionally, performance of the prediction action is started when the location information of the passenger is within a set calling range.

Optionally, the set calling interval is within a first preset radius centering at each elevator car.

Optionally, the location information of the passenger is acquired based on at least three Bluetooth modules in the Bluetooth matrix that are closest to the passenger carrying the personal mobile terminal.

Optionally, the location information of the passenger is acquired based on at least three Bluetooth modules in the Bluetooth matrix that have the strongest broadcast signals received by the personal mobile terminal carried by the passenger.

Optionally, the acquired location information is corrected based on a Bluetooth signal broadcast by at least a fourth Bluetooth module in the Bluetooth matrix.

Optionally, the Bluetooth signal of the Bluetooth module has a broadcast interval of 0.02 second to 1 second.

In order to achieve the object of the present application, according to another aspect of the present application, a readable storage medium is further provided, which has a computer program stored thereon, wherein the program is executable by a processor to implement the steps of the method as described above.

According to the system and method for detecting passenger's movement, the elevator-calling control method, the readable storage medium and the elevator system, the movement trajectory of the passenger is predicted more accurately so that on one hand, misjudgment is reduced and scheduling waste is decreased, and on the other hand, elevator assignment is accurately implemented in advance, thereby improving passenger experience.

BRIEF DESCRIPTION OF THE DRAWINGS

The technical solutions of the present disclosure will be further described in detail below with reference to the accompanying drawings and embodiments, but it should be understood that the drawings are only provided for the purpose of explanation, and should not be considered as limiting the scope of the present disclosure. In addition, unless otherwise specified, the drawings are only intended to conceptually illustrate the structures and constructions described herein, and are not necessarily drawn to scale:

FIG. 1 is a schematic diagram illustrating acquisition of location information of a passenger carrying a personal mobile terminal based on a Bluetooth matrix; and FIG. 2 is a schematic diagram of fitting a movement trajectory of a passenger in an elevator landing area based on multiple sets of location information in the present application.

DETAILED DESCRIPTION OF THE EMBODIMENT(S) OF THE INVENTION

The present application will now be described more fully with reference to the accompanying drawings, in which exemplary embodiments of the present application are shown. However, the present disclosure may be embodied in a variety of different forms and should not be construed as being limited to the embodiments set forth herein. Rather, the embodiments are provided to make the disclosure of the present disclosure become complete and thorough, and to fully convey the concept of the present application to those skilled in the art.

Although the features of the present application are disclosed in connection with several embodiments or one of the embodiments, as might be desirable and/or advantageous for any given or identifiable function, the features may be combined with one or more other features of other implementations/embodiments.

Several functional entities may be mentioned herein, which do not necessarily have to correspond to physically or logically independent entities. These functional entities may be implemented in software, or implemented in one or more hardware modules or integrated circuits, or implemented in different processing devices and/or microcontroller devices.

Herein, "calling trajectory A" refers to the trajectory of the passenger relative to the elevator car when he/she wants to take the elevator; conversely, "non-calling trajectory" refers to the trajectory of the passenger, who does not want to take the elevator, in the vicinity of the elevator car. The "calling trajectory" and the "non-calling trajectory" may each include a movement trajectory close to the elevator car, but in the present application, a movement trajectory close to the elevator car does not mean that it is a "calling trajectory".

As used herein, "elevator landing area" refers to a corresponding area for each floor that is used for the passenger to wait the elevator or used for the passenger to go to the elevator. It may be an area of a set size in front of the elevator car, such as a rectangular area with a side length of 10 meters; it may also cover all paths or areas in which the passenger heads for the elevator car after entering the building or leaving the room, etc.

Herein, Bluetooth module broadcast information includes "Bluetooth connection", "Bluetooth communication" and the like, such as Bluetooth communication based on a certain Bluetooth protocol.

FIG. 1 is a schematic diagram illustrating acquiring location information of a passenger 300 carrying a personal mobile terminal by a movement detection system 100 based on a Bluetooth matrix 110 according to an embodiment of the present disclosure. FIG. 2 is a schematic diagram of fitting a movement trajectory of the passenger 300 in an elevator landing area by the movement detection system 100 based on multiple sets of location information according to an embodiment of the present disclosure, wherein a portion of the elevator system 200 is also shown. The movement detection system 100 and the elevator system 200 of the embodiment of the present application will be described with reference to FIGS. 1 and 2 as follows.

The movement detection system 100 includes a Bluetooth matrix 110 installed in an elevator landing area, and a movement prediction unit not show, wherein the Bluetooth matrix 110 is composed of a plurality of Bluetooth modules 111, 112, 113 and 114 arranged in the elevator landing area. Once installed, the plurality of Bluetooth modules 111, 112, 113 and 114 will each have their particular location coordinates, and each Bluetooth module 111, 112, 113 and 114 will be configured to broadcast Bluetooth signals to the elevator landing area, respectively. When the passenger 300 carrying the personal mobile terminal passes through the Bluetooth matrix 110, its personal mobile terminal will receive the surrounding broadcast Bluetooth signals so that the movement detection system 100 can obtain location information of the passenger 300. Based on the three-point positioning principle, the movement detection system 100 will acquire the location information of the passenger 300 carrying the personal mobile terminal through the Bluetooth signals broadcast by at least three Bluetooth modules in the Bluetooth matrix 110. Thereafter, the movement prediction unit may fit the movement trajectory of the passenger 300 in the elevator landing area based on multiple sets of location information, and predict the movement trajectory to be the calling trajectory A or the non-calling trajectory B. For example, the predicted movement trajectory of the passenger 300 moving directly toward an elevator door 220 or moving toward the elevator door 220 along the oblique line in FIG. 2 is determined as the calling trajectory A; and the predicted movement trajectory of the moving passenger 300 who is deviated from the elevator door 220 is determined as the non-calling trajectory B.

Under such an arrangement, according to the movement detection system 100 of the present application, by acquiring multiple sets of location information of the moving passenger 300, the movement trajectory of the passenger 300 can be predicted more accurately, so that on one hand, the elevating-calling demand can be known about, misjudgment is reduced, and scheduling waste is decreased; and on the other hand, it is possible for the elevator system 200 to accurately assign an elevator car 210 in advance corresponding to the calling trajectory A to prepare the assisting work and improve the experience of the passenger 300.

Several details regarding the movement trajectory prediction in this concept are set forth in more detail below.

First, regarding the prediction manner of the movement trajectory, classification can be performed based on the landing point of an end point of the trajectory. For example, the movement prediction unit is configured to predict the movement trajectory to be the calling trajectory A when the end point of the movement trajectory falls within a set calling interval 120, and predict the movement trajectory to be the non-calling trajectory B when the end point of the movement trajectory does not fall within the set calling interval 120.

The set calling interval 120 may be an artificially set interval. For example, the set calling interval 120 may be defined in advance to include each elevator door 220 and a first preset length on one side or both sides of the elevator door 220. That is, after research, people in the related art finds that if the passenger 300 finally goes to these areas, then there is a very high probability that he/she wants to take the elevator. The set calling interval 120 may also be an interval obtained by self-learning of the system. After the predicted results are compared with the actual result for multiple times, some set calling intervals 120 that are inconsistent with the actual result may be screened out, and some excluded intervals may be reincorporated into the set calling intervals 120 to improve the movement detection process.

In addition, considering that there are too many people moving simultaneously in the elevator landing area, in order to reduce the system load or eliminate unnecessary prediction processes, a precondition for performing the prediction action by the movement prediction unit may also be set, that is, the movement prediction unit may begin to perform the prediction action when the location information of the passenger 300 is within a set calling range 130. The set calling range 130 may be an artificially set interval. For example, the set calling range 130 may be defined in advance as being within a first preset radius centering at each elevator car 210. That is, after research, people in the related art finds that if the passenger 300 finally enters these areas, then there is a high probability that he/she wants to take the elevator, and it is more meaningful to predict the following movement trajectory. The set calling range 130 may also be an interval obtained by self-learning of the system. After the predicted results are compared with the actual result for multiple times, some set calling ranges 130 that are inconsistent with the actual result may be screened out, and some excluded intervals may be reincorporated into the set calling ranges 130 to improve the movement detection process.

In addition, it can be known from the foregoing embodiment that in order to achieve the object of the present concept, the Bluetooth matrix 110 must include at least three Bluetooth modules, and the communication between the three Bluetooth modules and the personal mobile terminal carried by the passenger 300 achieves a three-point positioning effect so that the location information of the personal mobile terminal at a certain moment can be accurately obtained, that is, the location information of the passenger 300 carrying the personal mobile terminal at a certain moment is correspondingly acquired. Of course, out of other considerations, the arrangement and number of these Bluetooth modules may also be adjusted to achieve other purposes. An example will be explained as follows.

For example, the Bluetooth matrix 110 can include a plurality of Bluetooth modules spaced apart by the same distance. As another example, the Bluetooth matrix 110 is arranged in a form of rectangular or triangular grids, and the Bluetooth modules are located at individual intersections of the grid. Under this arrangement, a uniform coordinate system may be formed, so that the location information of the personal mobile terminal can be detected by the suitable Bluetooth modules at any moment, or the location information of a plurality of different personal mobile terminals can be detected by the suitable Bluetooth modules at any moment.

In addition, considering the signal strengths of the conventional Bluetooth modules, the Bluetooth modules in the Bluetooth matrix 110 may be spaced apart from each other by 4 to 8 meters (e.g., 4 meters), or the Bluetooth signal of the Bluetooth modules has a broadcast interval of 0.02 second to 1 second, thus ensuring better signal strength and continuity in the entire Bluetooth matrix 110.

With continued reference to FIGS. 1 and 2, an embodiment of an elevator system 200 is further provided herein, which includes a plurality of elevator cars 210, an elevator controller, and the movement detection system 100 according to any of the foregoing embodiments or a combination thereof. According to the elevator system 200 of the present application, by acquiring multiple sets of location information of the moving passenger 300 via the movement detection system 100, the movement trajectory of the passenger 300 can be predicted more accurately, so that on one hand, the elevating-calling demand can be known about, misjudgment is reduced, and scheduling waste is decreased; and on the other hand, it is possible to accurately assign an elevator car 210 in advance to prepare the assisting work and improve the experience of the passenger 300.

More specifically, the elevator controller is further configured to receive an elevator-calling request command transmitted from the personal mobile terminal, and assign an elevator corresponding to the calling trajectory A to go to the corresponding floor based on the predicted calling trajectory A, so that the assigned elevator can accurately correspond to the moving trajectory of the passenger 300, and the experience of the passenger 300 is improved.

Further, an embodiment of a method for detecting passenger's movement is further provided herein. The detection method includes: acquiring location information of a passenger carrying a personal mobile terminal by using Bluetooth signals broadcast by at least three Bluetooth modules in a Bluetooth matrix installed in an elevator landing area, fitting a movement trajectory of the passenger in the elevator landing area based on multiple sets of the location information, and predicting the movement trajectory to be a calling trajectory or a non-calling trajectory. According to the movement detection method of the present application, by acquiring multiple sets of location information of the moving passenger, the movement trajectory of the passenger can be predicted more accurately, so that on one hand, the elevating-calling demand can be known about, misjudgment is reduced, and scheduling waste is decreased; and on the other hand, it is possible for the elevator system to accurately assign an elevator car in advance corresponding to the calling trajectory to prepare the assisting work and improve the experience of the passenger.

Several details regarding the movement trajectory prediction in this concept are set forth in more detail below.

First, regarding the prediction manner of the movement trajectory, classification can be performed based on the landing point of an end point of the trajectory. For example, the movement trajectory is predicted to be the calling trajectory when the end point of the movement trajectory falls within a set calling interval, and is predicted to be the non-calling trajectory when the end point of the movement trajectory does not fall within the set calling interval. As one of the specific implementations, the set calling interval may include each elevator door and a first preset length on one side or both sides of the elevator door. Similarly, as described above, the set calling interval may be either an artificially set interval, or an interval obtained by self-learning of the system, so no repeated description is given herein.

In addition, considering that there are too many people moving simultaneously in the elevator landing area, in order to reduce the system load or eliminate unnecessary prediction processes, a precondition for performing the prediction action by the movement prediction unit may also be set, that is, performance of the prediction action is started when the location information of the passenger is within a set calling range. As one of the specific implementations, the set calling range is within a first preset radius centering at each elevator car. Similarly, as described above, the set calling range may be either an artificially set interval, or an interval obtained by self-learning of the system, so no repeated description is given herein.

In addition, it can be known from the foregoing embodiment that in order to achieve the object of the present concept, the Bluetooth matrix must include at least three Bluetooth modules, and the communication between the three Bluetooth modules and the personal mobile terminal carried by the passenger achieves a three-point positioning effect so that the location information of the personal mobile terminal at a certain moment can be accurately obtained, that is, the location information of the passenger carrying the personal mobile terminal at a certain moment is correspondingly acquired. Of course, out of other considerations, the arrangement and number of these Bluetooth modules may also be adjusted to achieve other purposes. An example will be explained as follows.

For example, the location information of the passenger may be acquired based on at least three Bluetooth modules in the Bluetooth matrix that are closest to the passenger carrying the personal mobile terminal. In general, information broadcast by a closer Bluetooth module can be more easily and clearly received by the personal mobile terminal to accurately acquire its location. However, in consideration of the situations such as obstruction by obstacles or damage or maintenance of some Bluetooth modules, the location information of the passenger may also be acquired based on at least three Bluetooth modules in the Bluetooth matrix that have the strongest broadcast signals received by the personal mobile terminal carried by the passenger.

For another example, in order to further improve the accuracy of the acquired location information, the acquired location information may also be corrected based on a Bluetooth signal broadcast by at least a fourth Bluetooth module in the Bluetooth matrix, thereby improving the subsequent trajectory prediction process.

In addition, considering the stability of signal strength and continuity of the conventional Bluetooth modules, the Bluetooth signal of each Bluetooth module in the Bluetooth matrix may be set to have a broadcast interval of 0.02 second to 1 second.

An elevator-calling control method for a passenger is further provided herein, which includes the movement detection method according to any of the foregoing embodiments or a combination thereof; furthermore, in a case that the movement trajectory is predicted to be a calling trajectory, an elevator corresponding to the calling trajectory is assigned to go to a corresponding floor, thereby accurately assigning an elevator car in advance to wait for the passenger and improve the passenger experience.

Moreover, aspects of the present application may be embodied as a system, a method, or a computer program product, as will be appreciated by those skilled in the art. Thus, aspects of the present application can take the following forms: full hardware implementation, full software implementation (including firmware, resident software, microcode, etc.), or an implementation that can be generally herein referred to as "service", "circuit", "circuitry", "module" and/or "processing system" as a whole and that combines software and hardware aspects. Furthermore, aspects of the present application can take the form of a computer program product embodied in one or more computer readable media having computer readable program codes implemented thereon.

Any combination of one or more computer readable medium having a computer program stored thereon may be utilized, and the program may be executed by a processor to implement the methods and steps in any of the foregoing embodiments or a combination thereof. The computer readable medium may be a computer readable signal medium or a computer readable storage medium. The computer readable storage medium may be, for example, but is not limited to, electronic, magnetic, optical, electromagnetic, infrared, or semiconductor system, apparatus, or device, or any suitable combination thereof. More specific examples (non-exhaustive list) of the computer readable storage medium will include the following items: electrical connections with one or more wires, portable computer disks, hard disks, random access memory (RAM), read-only memory (ROM), erasable programmable read-only memory (EPROM or flash memory), optical fibers, compact disk read-only memory (CD-ROM), optical storage device, magnetic storage device, or any suitable combination of these items. In the context of this document, the computer readable storage medium may contain or store any tangible medium that may be used by an instruction execution system, apparatus, or device or may be used therewith.

Program codes and/or executable instructions embodied on the computer readable medium may be transmitted using any suitable medium, including but not limited to wireless connection, wired connection, optical fiber cable, RF, etc., or any suitable combination of them.

Computer program codes for carrying out operations of aspects of the present application may be written using a programming language or any combination of many programming languages, including object-oriented programming languages such as Java, Smalltalk, C++, etc., and conventional programming languages, such as "C" programming language or similar programming language. The program codes may be executed entirely on the user's computer (device), partly on the user's computer, executed as a stand-alone software package, partly on the user's computer and partly on a remote computer, or entirely on a remote computer or server. In the latter case, the remote computer may be connected to the user's computer via any type of network, including a local area network (LAN) or a wide area network (WAN), or may be connected to an external computer (e.g., to implement a connection by an internet service provider via the internet).

The computer program instructions may be provided to a processor of a general-purpose computer, or a processor of a special-purpose computer, such as an image processor or other programmable data processing device to produce a machine such that instructions executed by a processor of a computer or other programmable data processing devices can create implementations for the functions/actions specified in one or more blocks of the flowchart and/or block diagram.

The computer program instructions may also be loaded onto a computer, other programmable data processing apparatuses, or other devices to cause a series of operational steps to be executed on a computer, other programmable apparatuses or other devices to produce a computer-implemented process, such that instructions executed on the computer or other programmable apparatuses provide a process for implementing the functions and actions specified herein.

Although a particular order of steps may be shown, disclosed, and claimed in particular embodiments, it is understood that unless otherwise indicated, the steps may be carried out, separated or combined in any order, which will still benefit from the disclosure.

In the description, examples are used to disclose the present disclosure, including the best mode, with the purpose of enabling any person skilled in the art to practice the disclosure, including making and using any device or system and performing any of the methods covered. The scope of protection of the present disclosure is defined by the claims, and may include other examples that can be conceived by those skilled in the art. If such other examples have structural elements that do not differ from the literal language of the claims, or if they include equivalent structural elements that do not substantively differ from the literal language of the claims, these examples are also intended to be included in the scope of the claims.

What is claimed is:

1. A system for detecting passenger movement, comprising:

a Bluetooth matrix installed in an elevator landing area, the Bluetooth matrix comprising at least three Bluetooth modules, and each of the Bluetooth modules being configured to broadcast a Bluetooth signal to the elevator landing area respectively;

wherein the system for detecting passenger movement acquires location information of a passenger carrying a personal mobile terminal by using Bluetooth signals broadcast by at least three Bluetooth modules;

the system for detecting passenger movement further comprises: a movement prediction unit configured to fit a movement trajectory of the passenger in the elevator landing area based on multiple sets of the location information, and predict the movement trajectory to be a calling trajectory or a non-calling trajectory.

2. The system for detecting passenger movement according to claim 1, wherein the movement prediction unit is configured to predict the movement trajectory to be the calling trajectory in a case that an end point of the movement trajectory falls within a set calling interval; and predict the movement trajectory to be the non-calling trajectory in a case that the end point of the movement trajectory does not fall within the set calling interval.

3. The system for detecting passenger movement according to claim 2, wherein the set calling interval comprises each elevator door and a first preset length on one side or both sides of the elevator door.

4. The system for detecting passenger movement according to claim 1, wherein the movement prediction unit is configured to start performing the prediction action when the location information of the passenger is within a set calling range.

5. The system for detecting passenger movement according to claim 4, wherein the set calling range is within a first preset radius centering at each elevator car.

6. The system for detecting passenger movement according to claim 1, wherein the Bluetooth modules in the Bluetooth matrix are equally spaced apart.

7. The system for detecting passenger movement according to claim 1, wherein the Bluetooth matrix is arranged in a form of rectangular or triangular grids, wherein the Bluetooth modules are located at respective intersections of the grids.

8. The system for detecting passenger movement according to claim 1, wherein the Bluetooth modules in the Bluetooth matrix are spaced apart from each other by 4 to 8 meters.

9. The system for detecting passenger movement according to claim 1, wherein the Bluetooth signal of the Bluetooth module has a broadcast interval of 0.02 second to 1 second.

10. An elevator system, comprising a plurality of elevator cars, an elevator controller, and a movement detection system; the movement detection system comprises:

a Bluetooth matrix installed in an elevator landing area, the Bluetooth matrix comprising at least three Bluetooth modules, and each of the Bluetooth modules being configured to broadcast a Bluetooth signal to the elevator landing area respectively;

wherein the movement detection system acquires location information of a passenger carrying a personal mobile terminal by using Bluetooth signals broadcast by at least three Bluetooth modules; and the movement detection system further comprises: a movement prediction unit configured to fit a movement trajectory of the passenger in the elevator landing area based on multiple sets of the location information, and predict the movement trajectory to be a calling trajectory or a non-calling trajectory.

11. The elevator system according claim 10, wherein the elevator controller is further configured to receive a calling request command transmitted from the personal mobile terminal, and assign an elevator corresponding to the predicted calling trajectory to go to a corresponding floor, based on the predicted calling trajectory.

12. The elevator system according claim 10, wherein the movement prediction unit is configured to predict the movement trajectory to be the calling trajectory in a case that an end point of the movement trajectory falls within a set calling interval; and predict the movement trajectory to be the non-calling trajectory in a case that the end point of the movement trajectory does not fall within the set calling interval.

13. The elevator system according claim 12, wherein the set calling interval comprises each elevator door and a first preset length on one side or both sides of the elevator door.

14. The elevator system according claim 10, wherein the movement prediction unit is configured to start performing the prediction action when the location information of the passenger is within a set calling range.

15. The elevator system according claim 14, wherein the set calling range is within a first preset radius centering at each elevator car.

16. The elevator system according to claim 11, wherein the Bluetooth modules in the Bluetooth matrix are equally spaced apart.

17. The elevator system according to claim 11, wherein the Bluetooth matrix is arranged in a form of rectangular or triangular grids, wherein the Bluetooth modules are located at respective intersections of the grids.

18. A method for detecting passenger movement, comprising:

acquiring location information of a passenger carrying a personal mobile terminal by using Bluetooth signals broadcast by at least three Bluetooth modules in a Bluetooth matrix installed in an elevator landing area; and fitting a movement trajectory of the passenger in the elevator landing area based on multiple sets of the location information, and predicting the movement trajectory to be a calling trajectory or a non-calling trajectory.

19. The method for detecting passenger movement according to claim 18, wherein the movement trajectory is predicted to be the calling trajectory in a case that an end point of the movement trajectory falls within a set calling interval, and is predicted to be the non-calling trajectory in a case that the end point of the movement trajectory does not fall within the set calling interval.

20. An elevator-calling control method for a passenger, comprising:

acquiring location information of a passenger carrying a personal mobile terminal by using Bluetooth signals broadcast by at least three Bluetooth modules in a Bluetooth matrix installed in an elevator landing area;

fitting a movement trajectory of the passenger in the elevator landing area based on multiple sets of the location information, and predicting the movement trajectory to be a calling trajectory or a non-calling trajectory; and in a case that the movement trajectory is predicted to be the calling trajectory, assigning an elevator corresponding to the calling trajectory to go to a corresponding floor.

* * * * *